US011256602B2

(12) United States Patent
Merey et al.

(10) Patent No.: US 11,256,602 B2
(45) Date of Patent: Feb. 22, 2022

(54) SOURCE CODE FILE RETRIEVAL

(71) Applicant: Red Hat, Inc., Raleigh, NC (US)

(72) Inventors: Aaron Bela Merey, Toronto (CA);
Frank Eigler, Toronto (CA)

(73) Assignee: RED HAT, INC., Raleigh, NC (US)

( * ) Notice: Subject to any disclaimer, the term of this patent is extended or adjusted under 35 U.S.C. 154(b) by 199 days.

(21) Appl. No.: 16/777,447

(22) Filed: Jan. 30, 2020

(65) Prior Publication Data

US 2021/0240596 A1 Aug. 5, 2021

(51) Int. Cl.
*G06F 11/36* (2006.01)
*G06F 8/36* (2018.01)
(Continued)

(52) U.S. Cl.
CPC ........ *G06F 11/3624* (2013.01); *G06F 16/245* (2019.01); *G06F 16/284* (2019.01);
(Continued)

(58) Field of Classification Search
CPC .. G06F 11/3624; G06F 11/36; G06F 11/3688; G06F 11/3628; G06F 11/3664; G06F 11/366; G06F 16/245; G06F 16/284; G06F 16/1774; G06F 16/10; G06F 16/21; G06F 16/906; G06F 16/951; G06F 16/95; G06F 16/31; G06F 16/313; G06F 8/71; G06F 8/36; G06F 8/75; G06F 8/751; G06F 8/73
See application file for complete search history.

(56) References Cited

U.S. PATENT DOCUMENTS 9,009,664 B2 * 4/2015 Muddu ............... G06F 8/36
717/121
9,092,565 B2 7/2015 Boxall et al.
(Continued)

FOREIGN PATENT DOCUMENTS

CN 110399300 A 11/2018
CN 109710299 A 5/2019
JP 2015011372 A 1/2015

OTHER PUBLICATIONS

Andrew Wiese et al., A Comparison of Stemmers on Source Code Identifiers for Software Search, IEEE 2011, [Retrieved on Sep. 8, 2021], Retrieved from the internet: <URL: https://ieeexplore.ieee.org/stamp/stamp.jsp?tp=&arnumber=6080817> 4 Pages (496-499) (Year: 2011).*

(Continued)

*Primary Examiner* — Anibal Rivera
(74) *Attorney, Agent, or Firm* — Haynes and Boone, LLP

(57) ABSTRACT

According to one example, a method includes receiving a query from a client device, the query comprising a specified build identifier and a specified source code file name, determining, by a server device, a source code file from a plurality of archives using the specified build identifier and the specified source code file name, wherein determining the source code file comprises matching a longest shared prefix of the archive name associated with the specified build identifier and an archive name from a set of archive names having archived file names corresponding to the specified source code file name, and after the determining, responding to the query with the source code file.

20 Claims, 5 Drawing Sheets

(51) Int. Cl.
    *G06F 9/44*         (2018.01)
    *G06F 16/245*     (2019.01)
    *G06F 16/28*      (2019.01)
    *G06F 16/10*      (2019.01)
    *G06F 16/951*     (2019.01)

(52) U.S. Cl.
    CPC ............ *G06F 11/36* (2013.01); *G06F 11/366* (2013.01); *G06F 11/3628* (2013.01); *G06F 11/3664* (2013.01); *G06F 11/3688* (2013.01); *G06F 16/10* (2019.01); *G06F 16/951* (2019.01)

(56) References Cited

U.S. PATENT DOCUMENTS

| | | | |
|---|---|---|---|
| 9,823,922 B1* | 11/2017 | Carmack | G06F 8/73 |
| 10,210,211 B2 | 2/2019 | Yahav | |
| 10,698,666 B2* | 6/2020 | Jensen | G06F 8/41 |
| 2018/0060216 A1 | 3/2018 | Kasi et al. | |
| 2019/0205105 A1* | 7/2019 | Jensen | G06F 16/148 |

OTHER PUBLICATIONS

Source ndexing is Underused Awesomeness; Published Nov. 11, 2011; https://randomascii.wordpress.com/2011/11/11/source-indexing-is-underused-awesomeness/.

* cited by examiner

SOURCE CODE FILE RETRIEVAL

BACKGROUND

The present disclosure relates generally to software development, and more particularly, to software debugging.

Software development includes writing source code, compiling or interpreting the source code into a binary executable file, and testing the compiled binary file on the selected hardware. At times, writing source code is difficult with the source code becoming complex, including multiple files, many variables, and different states. This complexity may introduce errors, or bugs, into the compiled binary that causes the software to run with unexpected results.

Software debugging is used by software developers to identify, analyze, and remove errors in the source code. Debugging tools are commonly used to aid in the process of debugging. Generally, debugging tools allow the software developer to see the location in the source file that correlates to the current process in the running software. That is, the software developer can step through the source code file of the compiled binary while the binary is running. This process facilitates the discovery and analysis of errors.

SUMMARY

According to one example, a method includes scanning a plurality of archives to create a first relational database between build identifiers and archive names of the plurality of archives, scanning the plurality of archives to create a second relational database between build identifiers and source code file names within the archives, scanning the plurality of archives to create a third relational database between the archive names and archived file names, the archived file names being names of files within the archives, receiving a query from a client device, the query comprising a specified build identifier and a specified source code file name, and responding to the query using the first relational database, second relational database, and third relational database and by matching a longest shared prefix of the archive name associated with the specified build identifier and an archive name from a set of archive names having archived file names corresponding to the specified source code file name.

According to one example, a method includes receiving a query from a client device, the query comprising a specified build identifier and a specified source code file name, determining, by a server device, a source code file from a plurality of archives using the specified build identifier and the specified source code file name, wherein determining the source code file comprises matching a longest shared prefix of the archive name associated with the specified build identifier and an archive name from a set of archive names having archived file names corresponding to the specified source code file name, and after the determining, responding to the query with the source code file.

A computing system includes a processor and a memory comprising machine readable instructions that when executed by the processor, cause the system to scan a plurality of archives to create a first relational database between build identifiers and archive names of the plurality of archives, scan the plurality of archives to create a second relational database between build identifiers and source code file names within the archives, scan the plurality of archives to create a third relational database between the archive names and archived file names, the archived file names being names of files within the archives, receive a query from a client device, the query comprising a specified build identifier and a specified source code file name, and respond to the query using the first relational database, second relational database, and third relational database and by matching a longest shared prefix of the archive name associated with the specified build identifier and an archive name from a set of archive names having archived file names corresponding to the specified source code file name.

Figure 1:
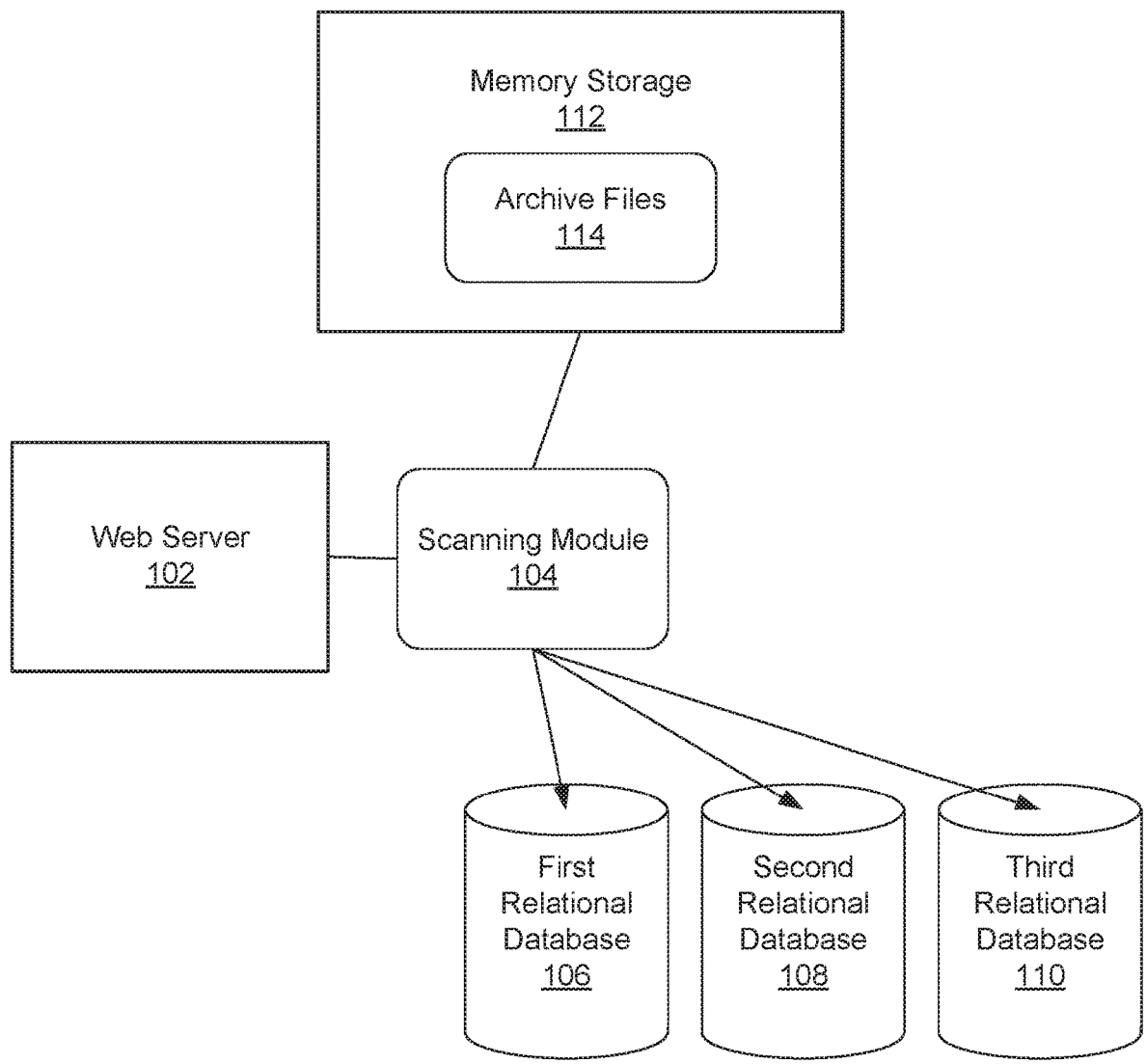
FIG. 1 is a diagram showing an illustrative scanning module for creation of relational databases for source code retrieval, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Software developers use debugging tools to find and correct errors in the source code they are writing. Finding the source files is not a problem when the software application is new, small, or does not have many external dependencies. However, finding the correct source code file becomes more difficult as the size of the application grows, the lifetime of the application increases, and the application has more software dependencies. This is especially a problem when developing software in large teams on a complex system such as, for example, the Red Hat Enterprise Linux operating system.

When developing a large application, or an integrated application, the software developer often encounters multiple versions of the software that are located in multiple archives such as, for example, the RPM archive system used by Red Hat Enterprise Linux and other operating systems. Not all software is developed from scratch. The software developer may rely on other external programs for further capabilities, such as, for example, system capabilities, graphical user interface (GUI) capabilities, networking capabilities, etc. The software applications may depend on other applications to function properly. An error in the source code of one application may cause problems in other applications. In that situation the developer can analyze and correct the error by debugging all applications involved, including other software not written by the developer. This debugging process requires the source code files of all the involved applications for the developer to see what is happening in the code of the other application.

The source code files for applications are not typically included in the installation of the application. One reason that the source code files are not part of the software installation is that users do not need the source code files to run the compiled binary application. Another reason is to save space on the user's computer system. Furthermore, to find the correct source file, the developer, or debugging tool, must know the current version of the software running and where that application's source code files are archived in order to find the correct source code file.

The current debugging process requires the software developer to manually download the appropriate debug info package from the distributor. The package then has to be installed on the system to place the files in the correct directory for the debugger tool to find. This provides one level of correct source code files for one application. This process has to be repeated for all files that are required for debugging. The process is further complicated by the need to know where the source code files are located and which version of the source code files to use. The software developer may have to visit multiple different distributors and download multiple different versions of a package to find all of the source files required to debug the application. Software version and file location matching can be delegated to a specialized application. For example, Linux distributions use package manager applications to manage package installations. However, this is dependent on the packaging infrastructure working properly. Furthermore, downloads need to be authenticated, the user must be running as root on Linux, and all packaging meta-data must be present. This method of retrieving source code files is limited to a certain style of dependency and version matching.

In the following description, methods and processes will be described that allow a software developer and a debugger tool to retrieve the correct source code files associated with any compiled binary with a high degree of accuracy. To do this, a client device sends a query containing the build identifier and the source code file name to a server. The server then responds to the query with the correct source code file by using a set of relational databases as described below.

To be prepared to respond to the query, the server indexes a variety of package files to create relational databases that may then be used to respond to the query from the client and provide the correct source code file. Specifically, the server scans and indexes multiple debug information files and source code file packages within package files or archives. As an example, the archives can be the Red Hat Package Manager (RPM) format of the Red Hat operating system. A first relational database is created that correlations build identifiers to the corresponding names of the archives as well as the names of files within the archives. For purposes of discussion, the names of the archives will be referred to as archive names and the names of the files within the archives will be referred to as archived file names. A second relational database is created that correlates build identifiers to the source code file names used to compile the application file. Source code file names are the names of source code files included among the archived file names. A third relational database is created that correlates archive names with archived file names.

Upon receiving the query from the client, the server uses the relational databases to determine the archive name associated with the build identifier specified in the query. This archive name will be referred to as archive name A. The server also uses the relational databases to determine a set of archive names having archived file names matching the source code file name specified in the query. This set of archive names is then sorted based on the longest matching prefix of archive name A. The archive name within the set having the longest prefix match with archive name A is selected as the designated archive. The server may then decompress and extract that archive and return the source code file having the specified source code file name to the client. Using this heuristic ensures that it is highly likely the designated source code file is the correct one sought by the debugger, as many archives might have identical archived file names.

This method works for different major versions of software and different architectures located in sibling directories. This method works for the old and new style debug RPM format. This method works when debug information and source code information are not hard coded into the files. This method works with other Linux distributions as well as other archiving systems. There is no need to hard code source code file structure into the heuristic. The method utilizes a standardized naming convention, which is common for software developers and large software projects.

FIG. 1 is a diagram showing an illustrative scanning module for creation of relational databases for source code retrieval. Web server 102 is shown for reference. Scanning module 104 communicates with memory storage 112 to retrieve archives 114. Using archives 114, scanning module 104 creates first relational database 106, second relational database 108, and third relational database 110.

For purposes of discussion, to distinguish archive packages from the files within such archive packages, archive packages will be referred to simply as an archive or archives. Files within an archive will be referred to as archived files. The following discussion also refers to the names of archives and archived files. Accordingly, the name of an archive will be referred to as simply an archive name and the names of archived files will be referred to as archived file names.

The web server 102 receives requests from and responds to a client system. In the present example, web server 102 may be any number of available web servers for any operating system such as, for example, Nginx, lighttpd, Apache, IIS, etc. In one example, web server 102 may be running on a single computer system. In another example, web server 102 may be running on multiple computer systems. The multiple computer systems may be located locally to one another or remotely. The multiple computer systems may perform load balancing in response traffic received on web server 102.

Memory storage 112 manages the storage of archives 114. Memory storage 112 may be any form of storage such as, for example, hard drives (HDD), solid state drives (SSD), solid state hybrid drives (SSHD), etc. In one example, memory storage 112 may be located on the same computer system as web server 102. In another example, memory storage 112 may be located on a different computer system than web server 102. The memory storage 112 computer system may be located locally to the web server 102 computer system or may be remotely located. The memory storage 112 computer system may be a single computer system or multiple computer systems. In another example, memory storage 112 may utilize a single storage device. In yet another example, memory storage 112 may utilize multiple storage devices of the same or different types of memory storage.

Archives 114 are stored on memory system 112. In the present example, archives 114 may be RPM Package Manager (RPM) files. In other examples, archives 114 may be other Linux distribution package management files, archives, etc. In an example, archives 114 may be the only files stored in memory storage 112. In another example, files other than archives 114 may be stored in memory storage 112 with archives 114. As an example, archives 114 may include compiled binary files, debug information files, and source code files in the same package. In another example, archives 114 may include compiled binary files, debug information files, or source code files in a single package. In another example, archives 114 may be hierarchical.

Scanning module 104 reads archives 114 from memory storage 112, scans them, and builds first relational database 106, a second relational database 108, and a third relational database 110. In the present example, scanning module 104 may be an application running on the same computer system as memory storage 112. In another example, scanning module 104 may be running on a different computer system than memory storage 112. Scanning module 104 may be located on a single computer system or multiple computer systems. The computer system running scanning module 104 may be local to the computer system running memory storage 112 or it may be remote to the memory storage 112 computer system. In an example, scanning module 104 may run on the same computer system as web server 102. In another example, scanning module 104 may run on a different computer system than web server 102. The scanning module 104 computer system may be local or remote to the web server 102 computer system.

Scanning module 104 creates first relational database 106, second relational database 108, and third relational database 110. In an example, databases 106, 108, 110 may be available database software such as Oracle DB, Microsoft SQL Server, MySQL, PostgreSQL, MariaDB, etc. In another example, databases 106, 108, 110 may be data structures stored in memory without using database software. In an example, databases 106, 108, 110 are hosted on the same computer system as scanning module 104. In another example, databases 106, 108, 110 are hosted on a different computer system than scanning module 104. In an example, databases 106, 108, 110 are hosted on the same computer system as web server 102. In another example, databases 106, 108, 110 are hosted on computer system separate from web server 102. In an example, databases 106, 108, 110 are hosted on the same computer system as memory storage 112. In another example, databases 106, 108, 110 are hosted on a different computer system than memory storage 112. In another example, first relational database 106, second relational database 108, and third relational database 110 are hosted on the same computer system. In a further example, each database 106, 108, 110 is hosted on a different computer system.

First relational database 106 stores data relating build identifiers to archive names. In the present example, the build identifier is a unique hash of the application file. The hash algorithm may be one of MD5, SHA-1, SHA-256, etc. In another example, build identifier is a unique identifier used by the given project or community. The build identifier is used to uniquely identify a specific application file.

Second relational database 108 stores data relating build identifiers to source code file names. In the present example, source code file names refer to source code files stored in an archive 114. The source code file names are for source code files among other archives within an archive.

Third relational database 110 stores data relating archived file names (i.e., the names of files within archives, which may include source code file names) to the name of the package (i.e., archive) that contains the archived file names. In the present example, the package may be a RPM. In another example, the package may be another archive format. The package data stored may include the version of the application. The package data stored may include the architecture information. The package data stored may include the distributor information.

Figure 2:
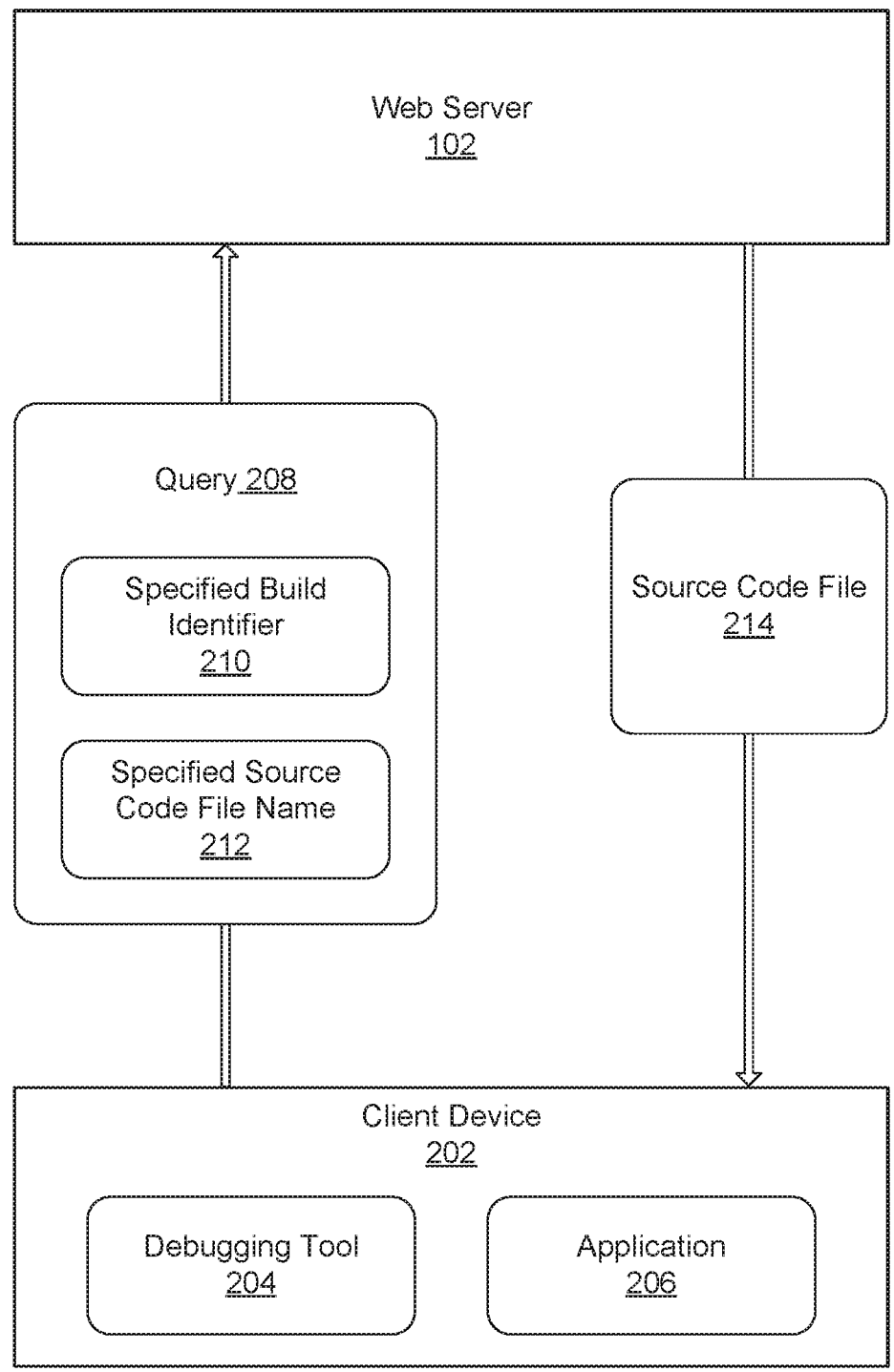
FIG. 2 is a diagram showing an illustrative web server for responding to a client request for a source code file, according to one example of principles described herein.

FIG. 2 is a diagram showing an illustrative web server for responding to a client request for a source code file. Client device 202 may run debugging tool 204. Debugging tool 204 may be used for debugging application 206. Debugging tool 204 may send query 208 to web server 102. Query 108 may contain specified build identifier 210 and specified source code file name 212. Web server 102 may receive query 208 and may respond with source code file 214.

Client device 202 may be a computer system used by software developers. In the present example, client device 202 may be a personal computer running an operating system such as Windows, OS X, Red Hat, etc. In another example, client device 202 may be another type of computer system, such as a main frame, an embedded system, etc. In one example, client device 202 may be running on the same computer system as web server 102. In another example, client device 202 may be running on a different computer system than web server 102. The client device 202 computer system may be local or remote to the web server 102 computer system. In an example, client device 202 may communicate with web server over Ethernet, coaxial, fiber-optic, Wi-Fi, etc.

Debugging tool 204 runs on client device 202. Debugging tool 204 may be any number of debugging tools including, for example, GNU Debugger (GDB). Debugging tool 204 may be used as part of a software integrated development environment (IDE) such as, for example, Eclipse, NetBeans, GNU Emacs, etc. A software developer may write application 206 using an IDE or any other text editing tool used to write source code. Debugging tool 204 may be used to debug application 206. Debugging tool 204 may aid the software developer in analyzing and correcting software errors. Debugging tool 204 may allow the software developer to step through the source code file. Debugging tool 204 may allow the software developer to step through the source code file while the compiled application binary is running.

Client device 202 may send a query 208 to web server 102. In one example, debugging tool 204 may send a query 208 when a source code file is not found on client device 202. Query 208 may include a specified build identifier 210 and a specified source code file name 212. The build identifier 210 may be a hash of the compiled binary file. In another example, the build identifier 210 may be a unique identifier according to a standardized scheme. The source code file name may include the entire file path. In some examples, the source code file name 212 may follow a standardized naming scheme. In some examples, the source code file name 212 may be included in the compiled binary file. Source code file names may include the version of the software build.

Query 208 may be sent, for example, as a HyperText Transfer Protocol (HTTP) Get request, an HTTP Post request, or an HTTP Put request. Query 208 may be formatted, for examples, as a key-value pair, a JavaScript Object Notation (JSON) format, Extensible Markup Language (XML) format, etc. In one example, query 208 may include a single specified build identifier 210 and a single specified source code file name 212. In another example, query 208 may include a single specified build identifier 210 and multiple specified source code file names 212. In a further example, query 208 may include multiple specified build identifiers 210 and multiple specified source code file names 212.

Specified build identifier 210 is used to identify a specific compiled binary file. In the present example, the compiled binary may be part of application 206. Debugging tool 204 may be debugging application 206. In the present example, specified build identifier 210 may be a hash of the compiled binary file. In one example, specified build identifier 210 may be extracted from the compiled binary. In another example, specified build identifier 210 may be another standardized format of build identifier that uniquely identifies a specific compiled binary.

Specified source code file name 212 may be the name of one of the source code files being written. In one example, specified source code file name 212 may be the name of a file that is part of application 206. In another example, specified source code file name 212 may be the name of one of the source code files of the compiled binary file that application 206 depends on for a specific feature or capability. In one example, specified source code file name 212 may be included in the compiled binary. In another example, specified source code file name 212 may be included in a separate debug information file. In a further example, specified source code file name 212 may include a version number. In one example, specified source code file name 212 may be a unique file name. In another example, specified source code file name 212 may be a common file name. In an example, specified source code file name 212 may follow a standardized file name scheme. Multiple specified source code file names 212 may correspond to a single specified build identifier 210.

Web server 102 may receive query 208 from client device 202. In an example, web server 102 may handle query 208. Web server 102 may retrieve source code file 214 based on query 208. In another example, web server 102 may forward query 208 to a separate server application. Web server 102 may receive source code file 214 in response to sending query 208 to the separate server application. In another example, web server 102 may retrieve source code file 214 based on query 208 from a cached previous response. In the present example, web server 102 may transmit source code file 214 to debugging tool 204 on client device 202 in response to query 208. In an example, debugging tool 204 may use source code file 214 to debug application 206. In the present example, debugging tool 204 may transmit a single query 208 to web server 102. In another example, debugging tool 204 may transmit multiple queries 208 to web server 102. Web server 102 may respond to each query 208 with a different source code file 214. In an example, multiple specified build identifiers 210 and multiple specified source code file names 212 may be grouped into a single query 208. In another example, web server 102 may respond to a query 208 containing multiple specified build identifiers 210 and multiple specified source code file names 212 with multiple source code files 214.

Figure 3:
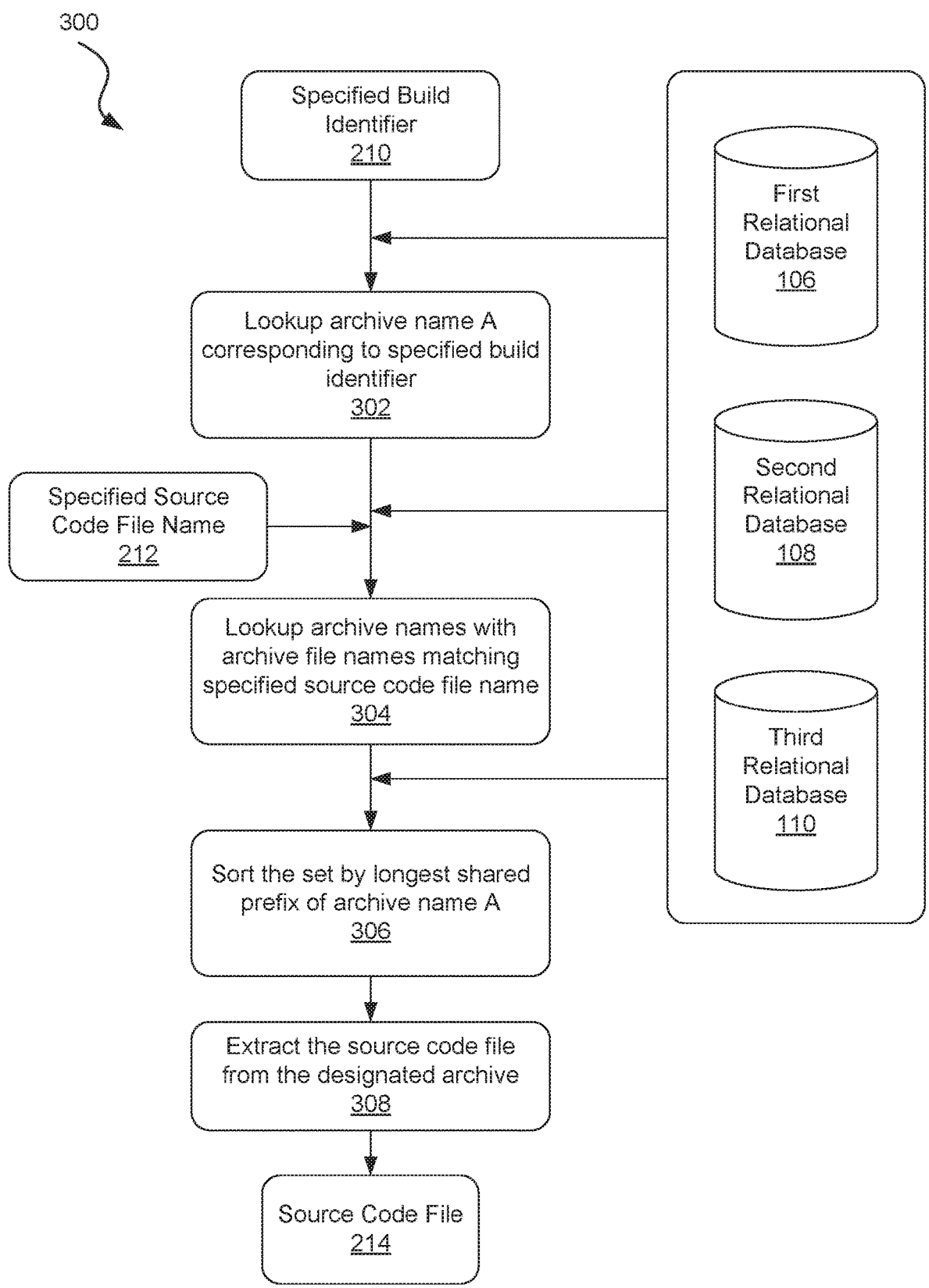
FIG. 3 is a diagram showing an illustrative process by which the web server retrieves a source code file using the relational databases, according to one example of principles described herein.

FIG. 3 is a diagram showing an illustrative process by which the web server retrieves a source code file using the relational database. According to the present example, the process 300 receives a specified build identifier 210 from a client system (e.g., 202) as part of the query (e.g., 208). At process 302, the web server uses the received specified build identifier 210 and the first relational database to find the name of the archive that includes the executable with the build identifier. For purposes of discussion, this archive name will be referred to as archive name A. It is noted that in the present discussion, the terms archive name and archived file name refer to two separate things. The term archive name refers to the name of an archive or package file. The term archived file name refers to the name of a file within an archive or package. Archived file names may include the names of source code files in addition to other file names within the archive. In an example, first relational database 106 is a database that may be queried using a database query language (e.g., SQL, NOSQL, etc.). In another example, first relational database 106 is a data structure in memory that may be read using custom software.

Process 300 continues, in the present example, by using the specified source code file name 212 as well as the relational databases 106, 108, 110 to determine a set of archive names that have archived file names that match the specified source code file name 212. This set will be referred to as set S. In some examples, set S may have only one archive name. In some examples, however, set S will have multiple archive names because multiple archives may include a source code file having the same name as the specified source code file name. However, to find the correct source code file name, the process 300 continues at process 306.

Process 306 includes sorting the set of archive names based on which has the longest shared prefix with archive name A. For example, the archive name A prefix may be, for example, usr/AAA/BBB/CCC. The set S may include a first archive name with prefix usr/AAA/BBB/DDD and a second archive name with usr/AAA/EEE/FFF. In this case, the first archive name has a longer shared prefix with archive A than does the second archive name.

Process 300 then continues at process 308 where it selects the archive with the longest file path prefix (the first archive in the example given above). The selected archive may then be decompressed. After decompression, the source code file 214 corresponding to the source code file name within that selected archive is then provided to the client. By using the process described above, the correct source code file can be provided, and a user does not have to navigate the file storage systems to locate the proper archive and the proper source code file. This provides a much more efficient and convenient method for the user.

Figure 4:
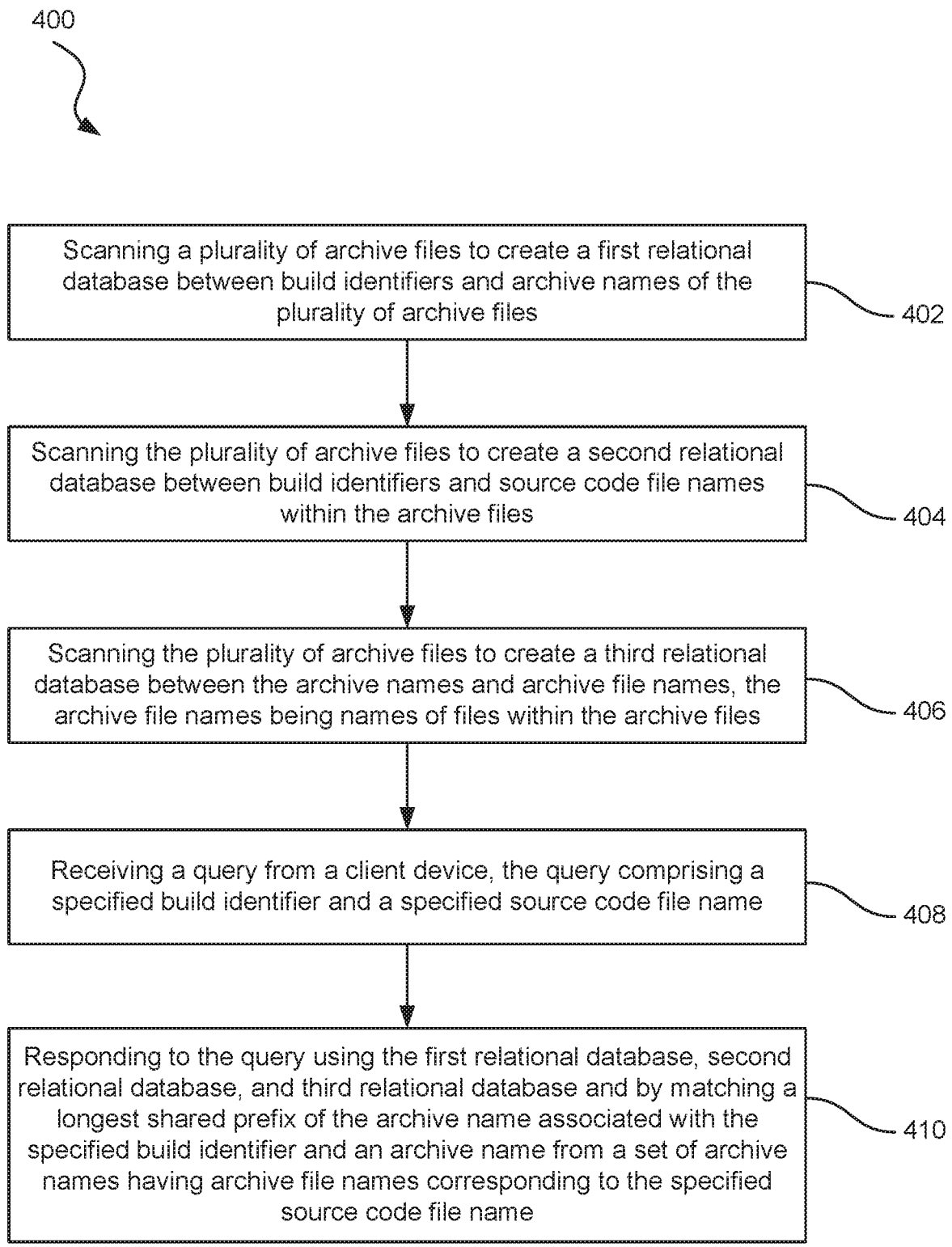
FIG. 4 is a flowchart showing an illustrative method for source code retrieval, according to one example of principles described herein.

FIG. 4 is a flowchart showing an illustrative method for source code retrieval. According to one example, the method 400 includes a process 402 for scanning a plurality of archives to create a first relational database between build identifiers and archive names of the plurality of archives. In the present example, the build identifier may be a hash of the binary application file or files. In another example, the build identifier may be another standardized unique file identifier. The build identifier may be unique to one binary application file.

The method 400 further includes a process 404 for scanning the plurality of archives to create a second relational database between build identifiers and source code file names within the archives.

The method 400 further includes a process 406 for scanning the plurality of archives to create a third relational database between the archive names and names of the files within the archive (archived file names). As described above, the third relational database may be any of the available database software such as Oracle, MySQL, MariaDB, etc. In another example, the third relational database may be a memory data structure built using custom software for storing related data. For example, the archives may be RPM files. In another example, the archives may be another archive format.

The method 400 further includes a process 408 for receiving a query from a client device, the query comprising a specified build identifier and a specified source code file. The specified build identifier and specified source code file name are used to uniquely identify the source code file that was used to build the application file identified by the build identifier. As discussed above, the query may contain multiple specified source code files. In another example, the query may include multiple specified build identifiers and multiple specified source code files.

The method 400 further includes a process 410 for responding to the query using the first relational database, second relational database, and third relational database and by matching a longest file location prefix of the specified source code file with source code files of the plurality of archives. In one example, process 410 may use a SQL join operation to request a list of source code file names from the relational databases. In another example, the information may be read from a memory data structure and filtered to create a list of possible source code files. In the present example, process 410 matches the longest file name prefix based on the standardized naming convention of Red Hat Enterprise Linux. In another example, matching the longest file name prefix is based on another file naming convention. In one example the file name prefix includes the file path information. In another example, the file name prefix includes version information.

Figure 5:
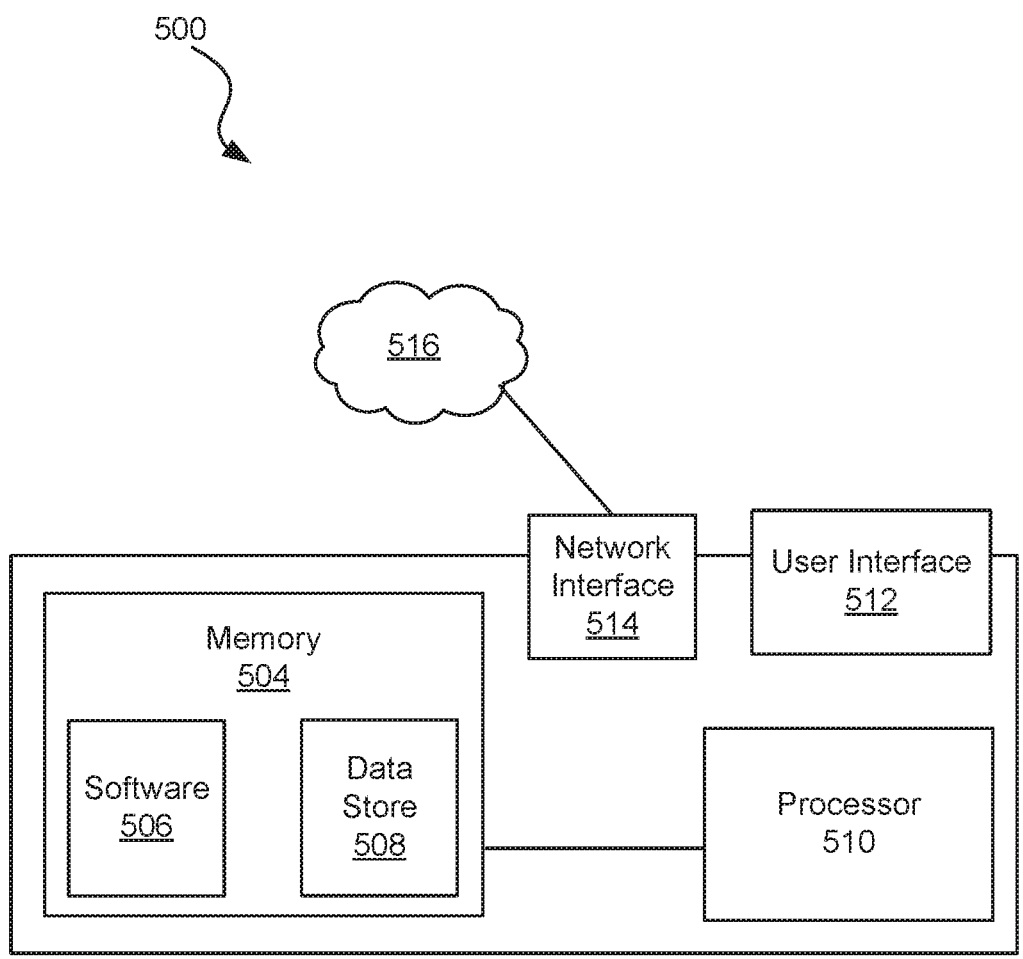
FIG. 5 is a diagram showing an illustrative computing system for source code retrieval, according to one example of principles described herein.

FIG. 5 is a diagram showing an illustrative computing system that may be used to perform the principles described herein. For example, the computing system 500 may be used to perform the functions performed in methods 300 and 400. Other functions described herein may also be performed by computing systems such as computing system 500. According to certain illustrative examples, the computing system 500 includes a memory 504 which may include software 506 and a data store 508. The computing system 500 also includes a processor 510, a network interface 514, and a user interface 512.

The memory 504 may be one of several different types of memory. Some types of memory, such as solid-state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 506 and data in the data store 508.

The computing system 500 also includes a processor 510 for executing the software 506 and using or updating the data 508 stored in memory 504. The software 506 may include an operating system and any other software applications a user may wish to install. In some examples, the computing system 500 may be associated with a user. In such case, the software 506 may be an application to render web content, such as a browser. The software 506 may include machine readable instructions of a computer program product that when executed, perform the functions described above.

The user interface 512 may include a number of input devices such as a mouse, touchpad, or touchscreen that allow the user to interact with the computing system 500. The user interface 512 may also include a number of different types of output devices such as a monitor or a touchscreen. The user interface allows the user to interact with the processing system 500 in a manner as described above.

The network interface 514 may include hardware and software that allows the processing system 500 to communicate with other processing systems over a network 516. The network interface 514 may be designed to communicate with the network 516 through hardwire media such as Ethernet, coaxial, fiber-optic, etc. The network interface 514 may also be designed to communicate with the network 516 using wireless technologies.

Some examples of processing systems described herein may include non-transient, tangible, machine readable media that include executable code that when run by one or more processors (e.g., processor 104) may cause the one or more processors to perform the processes of the methods described above. Some common forms of machine readable media that may include the processes of the methods are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
   scanning a plurality of archives to create a first relational database between build identifiers and archive names of the plurality of archives;
   scanning the plurality of archives to create a second relational database between build identifiers and source code file names within the archives;
   scanning the plurality of archives to create a third relational database between the archive names and archived file names, the archived file names being names of files within the archives;
   receiving a query from a client device, the query comprising a specified build identifier and a specified source code file name; and
   responding to the query using the first relational database, second relational database, and third relational database and by matching a longest shared prefix of the archive name associated with the specified build identifier and an archive name from a set of archive names having archived file names corresponding to the specified source code file name.

2. The method of claim 1, wherein responding to the query comprises using the first relational database to identify an archive name (A) associated with the specified build identifier.

3. The method of claim 2, wherein responding to the query further comprises using the first relational database and the second relational database to determine the set of archive names having archived file names corresponding to the specified source code file name.

4. The method of claim 3, wherein responding to the query further comprises sorting the set of archive names by shared prefix length and selecting an archive name from the set of archive names having the longest shared prefix length.

5. The method of claim 4, further comprising, returning a source code file from the selected archive.

6. The method of claim 1, wherein the scanning of the archives is performed by a scanning module associated with a web server.

7. The method of claim 1, wherein the query is received from a debugging tool on a client device.

8. The method of claim 7, wherein the specified build identifier is associated with an application being debugged by the debugging tool.

9. The method of claim 7, wherein the specified source code file name is associated with an application being debugged by the debugging tool.

10. A computing system comprising:
a processor; and
a memory comprising machine readable instructions that when executed by the processor, cause the system to:
scan a plurality of archives to create a first relational database between build identifiers and archive names of the plurality of archives;
scan the plurality of archives to create a second relational database between build identifiers and source code file names within the archives;
scan the plurality of archives to create a third relational database between the archive names and archived file names, the archived file names being names of files within the archives;
receive a query from a client device, the query comprising a specified build identifier and a specified source code file name; and
respond to the query using the first relational database, second relational database, and third relational database and by matching a longest shared prefix of the archive name associated with the specified build identifier and an archive name from a set of archive names having archived file names corresponding to the specified source code file name.

11. The system of claim 10, wherein the system is further to respond to the query by:
using the first relational database to identify an archive name (A) associated with the specified build identifier; and
using the first relational database and the second relational database to determine the set of archive names having archived file names corresponding to the specified source code file name.

12. The system of claim 11, wherein the system is further to respond to the query by:
sorting the set of archive names by shared prefix length and selecting an archive name from the set of archive names having the longest shared prefix length.

13. A computer program product on a non-transitory machine-readable medium, the computer program product comprising code for:
scanning a plurality of archives to create a first relational database between build identifiers and archive names of the plurality of archives;
scanning the plurality of archives to create a second relational database between build identifiers and source code file names within the archives;
scanning the plurality of archives to create a third relational database between the archive names and archived file names, the archived file names being names of files within the archives;
receiving a query from a client device, the query comprising a specified build identifier and a specified source code file name; and
responding to the query using the first relational database, second relational database, and third relational database and by matching a longest shared prefix of the archive name associated with the specified build identifier and an archive name from a set of archive names having archived file names corresponding to the specified source code file name.

14. The computer program product of claim 13, wherein responding to the query comprises using the first relational database to identify an archive name (A) associated with the specified build identifier.

15. The computer program product of claim 14, wherein responding to the query further comprises using the first relational database and the second relational database to determine the set of archive names having archived file names corresponding to the specified source code file name.

16. The computer program product of claim 15, wherein responding to the query further comprises sorting the set of archive names by shared prefix length and selecting an archive name from the set of archive names having the longest shared prefix length.

17. The computer program product of claim 16, further comprising, returning a source code file from the selected archive.

18. The computer program product of claim 13, wherein the scanning of the archives is performed by a scanning module associated with a web server.

19. The computer program product of claim 13, wherein the query is received from a debugging tool on a client device.

20. The computer program product of claim 19, wherein the specified build identifier is associated with an application being debugged by the debugging tool.

* * * * *